United States Patent [19]
Takagi et al.

[11] Patent Number: 5,197,091
[45] Date of Patent: Mar. 23, 1993

[54] PORTABLE TELEPHONE HAVING A PIPE MEMBER WHICH SUPPORTS A MICROPHONE

[75] Inventors: Hisamitsu Takagi, Inagi; Masashi Tomura, Tokyo; Akihide Nishiyama, Yokohama; Hideharu Suzuki, Kawasaki; Yukio Murayama, Tama, all of Japan

[73] Assignee: Fujitsu Limited, Kawasaki, Japan

[21] Appl. No.: 615,402

[22] Filed: Nov. 19, 1990

[30] Foreign Application Priority Data

Nov. 20, 1989 [JP] Japan ..................... 1-299711

[51] Int. Cl.$^5$ ........................... H04M 11/00
[52] U.S. Cl. ..................... 379/58; 379/433; D14/138; 455/90
[58] Field of Search ............ 379/61, 428, 433, 434, 379/58, 201; D14/137, 138; 455/89, 90, 348

[56] References Cited

U.S. PATENT DOCUMENTS 4,782,527 11/1988 Williamson et al. .............. 379/433
5,109,539 4/1992 Inubushi et al. .................. 379/433

FOREIGN PATENT DOCUMENTS 0389676 10/1990 European Pat. Off. ........... 379/428
0981271 5/1951 France ........................... 379/434
0086929 4/1988 Japan ........................... D14/138
1185777 3/1970 United Kingdom ............. 379/433

OTHER PUBLICATIONS

WO9010347, World publication, Sudo et al., Sep. 1990.

*Primary Examiner*—Curtis Kuntz
*Assistant Examiner*—Dwayne D. Bost
*Attorney, Agent, or Firm*—Staas & Halsey

[57] ABSTRACT

A compact portable telephone, in which a sufficient distance between the receiving portion and the voice inlet portion can be secured when the telephone is used. A flexible pipe member formed of metallic or dielectric material is slidably or swingably attached to the main body of the telephone or has its base fixedly attached to the main body. The flexible pipe member is provided at its end with a microphone. When the flexible pipe member is formed of metallic material, the flexible pipe member is used as an antenna. When the flexible pipe member is formed of dielectric material, at least one of a pair of cords connected to the microphone is utilized as an antenna.

14 Claims, 10 Drawing Sheets

FIG. 1
FIG. 2
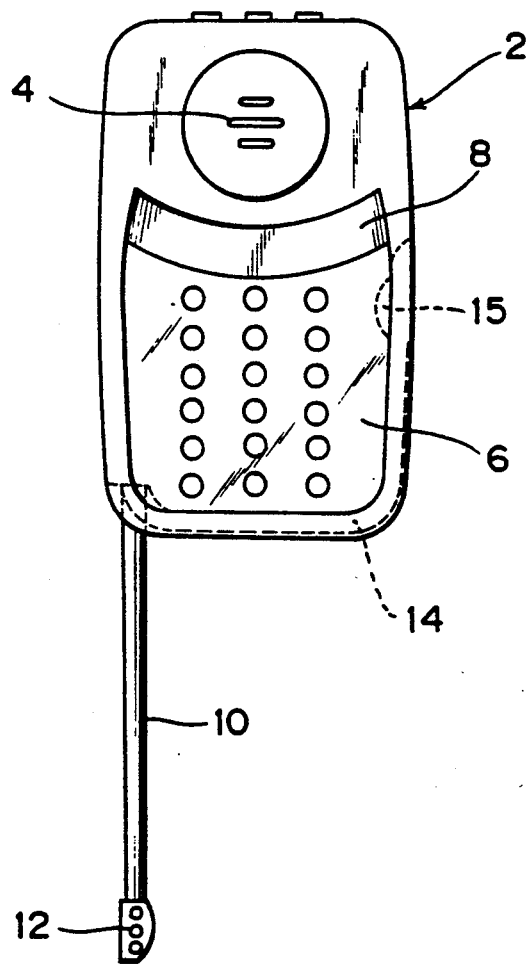
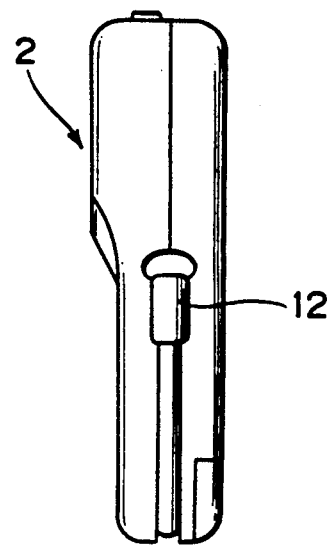

PORTABLE TELEPHONE HAVING A PIPE MEMBER WHICH SUPPORTS A MICROPHONE

BACKGROUND OF THE INVENTION

The present invention relates to a portable telephone. The term "portable telephone" used herein includes a general cordless telephone.

The ultimate object of communication is, of course, to transmit, or exchange, thought or information from anywhere to, or with, anyone, anytime, immediately. In addition to conventional communications between two fixed points, mobile communications are being progressively developed. The mobile communications are those held by mobile bodies (including human beings) such as ships, motor vehicles, airplanes, etc. with the general subscription telephone system, offices, etc. and those between mobile bodies. Lately, portable telephones and cordless telephones as kinds of mobile communications are being extensively developed.

Reduction in size is an important factor for promoting practical use of the portable telephone. On one hand, reduction in size of the portable telephone has become easier because parts small in size and low in cost are made available with progress in the technology for fabricating related devices, but on the other hand, requirement for consideration of human engineering on account of the fact that the telephone must be used with the receiver held to the human ear seems to be preventing the reduction in size. Under these circumstances, there are demands for achieving the reduction in size of the portable telephone while paying due regard to human engineering.

Telephone sets in general are used with the receiving portion held to the ear and the transmitting portion held toward the mouth. Even with the portable telephone, the receiving portion and transmitting portion must be kept a sufficient distance apart and therefore the portable telephone itself has had to be shaped in a somewhat elongated form.

The conventional portable telephone has involved a problem that its reduction in size is not sufficiently attainable because the distance between the receiving portion and the transmitting portion on the main body of the telephone has been set to be virtually equal to the distance between the ear and the mouth of the user. Thus, while it is made relatively easier to produce small-sized portable telephones because small sized and low cost parts constructing the portable telephone are made available with the progress in the fabricating technology of the parts, the requirement for consideration of human engineering to secure a distance corresponding to that between the ear and the mouth between the receiving portion and transmitting portion has been a factor preventing the reduction in size.

SUMMARY OF THE INVENTION

An object of the present invention is to provide a portable telephone in which the above described problem involved in the conventional art is solved and a sufficient distance between the receiving portion and voice inlet portion at the time the telephone is used is secured even if the main body of the portable telephone is made sufficiently small in size.

In accordance with an aspect of the present invention, there is provided a portable telephone, which includes a power source, a transmission/reception circuit, a speaker, and an antenna matching circuit, comprising a main body, a pipe member formed of metallic material slidably attached to the main body, a microphone attached to the end of the pipe member, first connection means for connecting the microphone, when the pipe member is pulled out of the main body, with the transmission/reception circuit, and second connection means for connecting the pipe member with the antenna matching circuit.

A flexible pipe member formed of metallic material may be arranged to have its base fixedly attached to the telephone main body, instead of being slidably attached thereto, so that, when the telephone is used, the flexible pipe member may be stretched out for use and, when the telephone is not used, the portion at the end of the flexible pipe member may be locked to the telephone main body.

As another alternative, a flexible pipe member formed of metallic material may be swingably attached to the telephone main body, whereby, when the telephone is used, the pipe member is swung so that the microphone comes toward the mouth and, when it is not used, the pipe member is locked to the telephone main body through an engagement means.

Otherwise, the flexible pipe member may be formed of dielectric material such as plastics, in which case at least one of the connection cords for the microphone is used as an antenna. Further, the microphone may be provided at the base of the flexible pipe member, with the flexible pipe member used as a voice tube.

In the present invention, the microphone is provided at the end or the base of the flexible pipe member, and the flexible pipe member is slidably, swingably, or fixedly attached to the main body of the portable telephone. Hence, it becomes possible to sufficiently reduce the size of the main body of the portable telephone. When the telephone is used, the flexible pipe member is pulled or stretched out so that the microphone or the voice inlet portion is brought toward the mouth and, when the telephone is not used, the flexible pipe member is locked to the interior of the main body, or to the side face of the main body, so as to be received therein.

The above and other objects, features and advantages of the present invention and the manner of realizing them will become more apparent, and the invention itself will best be understood from a study of the following description and appended claims with reference had to the attached drawings showing some preferred embodiments of the invention.

BRIEF DESCRIPTION OF THE DRAWINGS

FIG. 1 is a plan view of a first embodiment of the present invention;

FIG. 2 is a side view of the first embodiment in a state where a flexible pipe member is received therein;

FIG. 5A, FIG. 5B to FIG. 7A, FIG. 7B are drawings showing forms of voice tubes, of which FIGS. 5A, 6A, and 7A show sectional views and FIGS. 5B, 6B, and 7B show right-hand side views;

DESCRIPTION OF THE PREFERRED EMBODIMENTS

An embodiment of the present invention will be described below with reference to the accompanying drawings.

Figure 3:
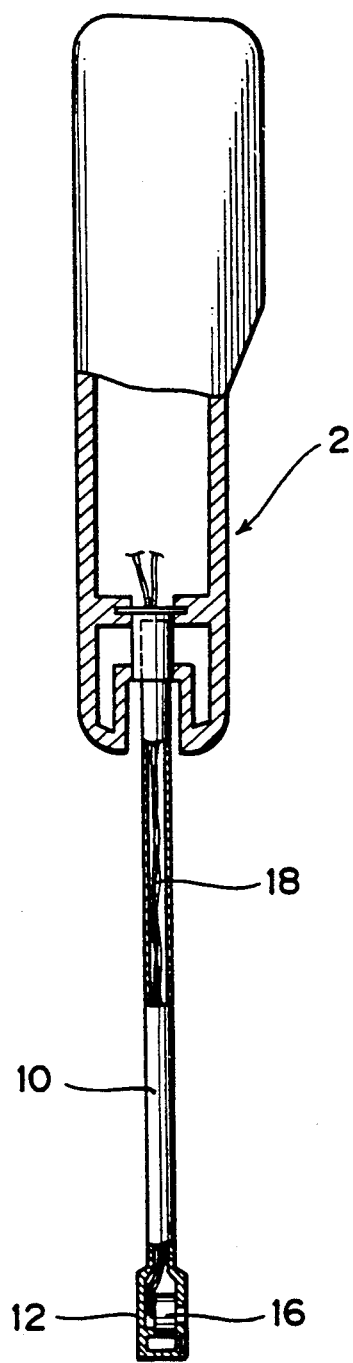
FIG. 3 is a sectional view of the first embodiment.

FIG. 1 is a plan view of a first embodiment of the present invention, FIG. 2 is a side view of the embodiment in a state where its flexible pipe member is received in the main body, and FIG. 3 is a sectional view of the embodiment. The main body 2 of the portable telephone is provided with a receiver portion 4 containing a speaker, a switch portion 6, and a display portion 8 of a liquid crystal display or the like. To the main body 2, a flexible pipe member 10 formed of metallic material is attached with its one end fixed thereto. At the distal end of the flexible pipe member 10, there is provided a microphone hold portion 12 containing a microphone. In the side face of the main body 2, there is made a receiving groove 14, and it is adapted such that, when the telephone is not used, the flexible pipe member 10 is put into this receiving groove 14 and the microphone hold portion 12 is engaged with an engagement groove 15.

As shown in FIG. 3, a microphone 16 is contained in the microphone hold portion 12 and connection cords 18 of the microphone 16 are connected with a transmission circuit within the main body 2. The metallic flexible pipe member 10 serves as an antenna and is connected with an antenna matching circuit. The distance between the receiver portion 4 and the microphone hold portion 12 is set to be virtually equal to the distance between the ear and the mouth of a human being and, since the pipe member 10 is flexible, the microphone hold portion 12 can be easily brought near the mouth by bending the pipe member. When the telephone is not used, the flexible pipe member 10, as described above, can be bent and put into the receiving groove 14. In the present embodiment, as described above, not only the reduction in size of the main body 2 of the portable telephone is achieved but also a sufficient distance from the point of view of human engineering between the receiver portion 4 and the microphone hold portion 12 can be secured.

In the above described first embodiment, the flexible pipe member 10 is made of metallic material but the flexible pipe member can be formed of dielectric material such as plastics. In such case, at least one of the microphone connection cords 18 may be used as the antenna.

Figure 4A:
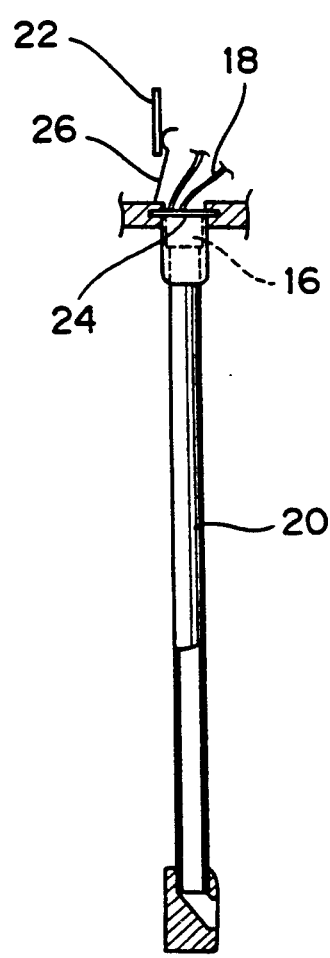
FIG. 4A is a sectional view of a second embodiment using a voice tube.
Figure 4B:
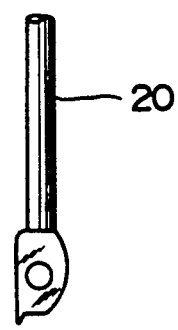
FIG. 4B is a right-hand side view showing a portion of the second embodiment.
Figures 5A, 5B, 6A, 6B:
Figures 7A, 7B:
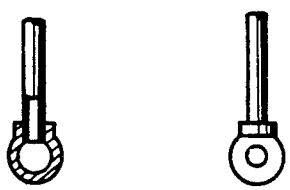

Referring to FIG. 4A and FIG. 4B, there are shown a sectional view and a right-hand side view, respectively, of a second embodiment of the present invention using a flexible voice tube. In this embodiment, the microphone 16 is provided at the base of a flexible pipe member 20 and the flexible pipe member 20 is used as the voice tube. In order to use the flexible pipe member 20 also for an antenna, it is preferred that the flexible pipe member 20 be formed of a metallic material. A printed wiring board 24 for the microphone 16 is connected with an antenna matching circuit 22 through a plate spring 26. Various forms can be used as the voice tubes as shown in FIG. 5A to FIG. 7B. In each pair of the figures, A shows a sectional view and B shows a right-hand side view.

Figure 8:
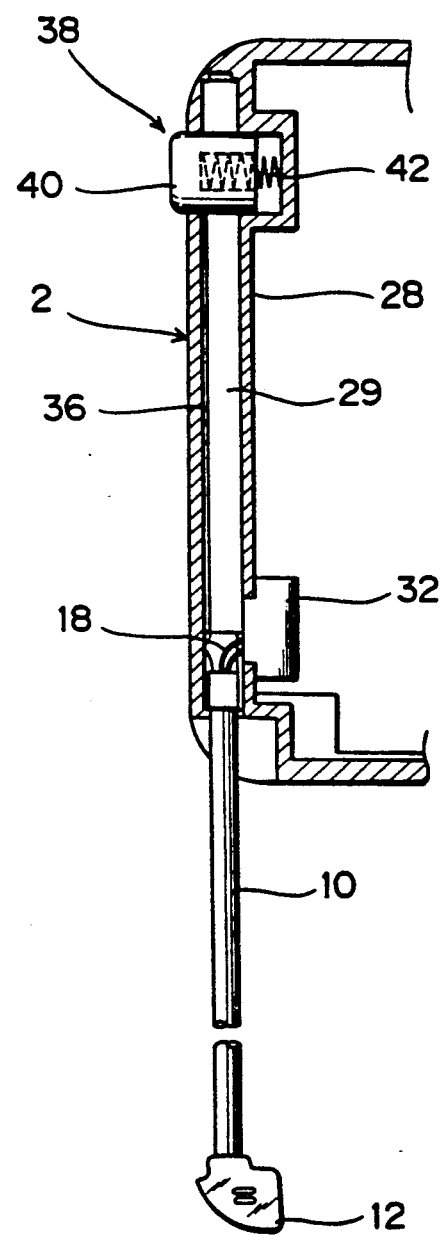
FIG. 8 is a sectional view of a third embodiment of a slide type.

Referring now to FIG. 8, there is shown a sectional view of a third embodiment of a slide type. There is provided a partition wall 28 on the main body of the portable telephone and a slide groove 29 is formed between this partition wall 28 and a side wall of the main body of the portable telephone. In this slide groove 29 is slidably fitted a flexible pipe member 10. When the telephone is used, the flexible pipe member 10 is pulled out and, when the telephone is not used, the flexible pipe member 10 is pushed into the slide groove 29 and stored therein.

Figure 9:
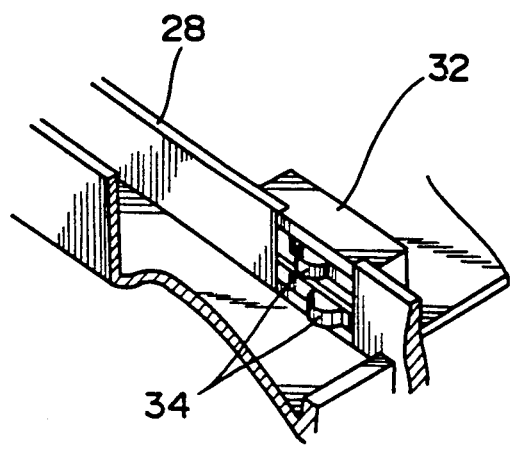
FIG. 9 is a perspective view of a contact portion of the third embodiment shown in FIG. 8.
Figure 10:
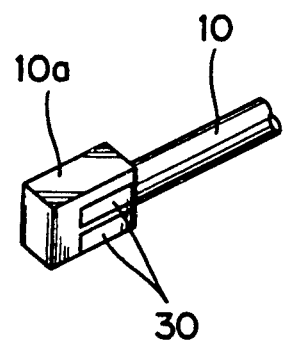
FIG. 10 is a drawing showing the base of the flexible pipe member of the third embodiment.
Figure 11:
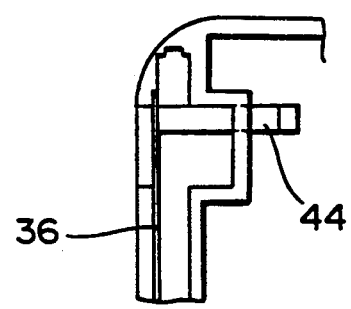
FIG. 11 is a schematic diagram showing a portion including a contact spring of the third embodiment.

At the base of the flexible pipe member 10, there is provided a terminal block 10a in the form of a rectangular parallelepiped as shown in FIG. 10. On one face of the terminal block 10a, there are provided a pair of microphone connection terminals 30 and, on the opposite face, there is provided an antenna contact spring. Further, as shown in FIG. 9, there is provided a connector 32 having a pair of contacts 34 on the side of the telephone main body, the contacts 34 being connected with the transmission circuit. On the interior of the side wall of the main body 2, there is provided an antenna element 36 which is put into connection with the antenna contact spring provided on the terminal block 10a when the flexible pipe member 10 is pulled out. The antenna element 36 is connected with the antenna matching circuit 22 through a contact spring 44 as shown in FIG. 11 and FIG. 12.

Figure 12:
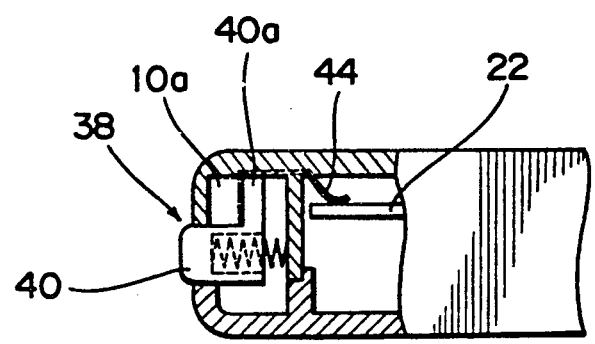
FIG. 12 is a sectional view showing a portion including a connection portion with an antenna matching circuit of the third embodiment.

Referring to FIG. 8 and FIG. 12, reference numeral 38 denotes an engagement means, basically formed of a push-button 40 and a coil spring 42, for preventing the flexible pipe member 10 from jumping out of the slide groove 29 when the flexible pipe member 10 is stored in the slide groove 29 by being pushed therein. When storing the flexible pipe member 10, the flexible pipe member 10 is pushed into the slide groove 29, with the push-button 40 depressed to its innermost point, and then the push-button 40 is released, whereby a press portion 40a formed integral with the push-button 40 presses on the terminal block 10a of the flexible pipe member 10, whereby the flexible pipe member 10 is prevented from slipping out of the interior of the slide groove 29. When pulling out the flexible pipe member 10, the push-button 40 is just depressed, whereby the engagement between the press portion 40a and the terminal block 10a is released and the flexible pipe member 10 can be easily pulled out.

Since the flexible pipe member 10 is formed of metallic material, the flexible pipe member 10 serves as an antenna in its state pulled out as shown in FIG. 8, and in this state, it is connected with the antenna matching circuit 22 through the antenna element 36 and the contact spring 44.

The same as in the above described first embodiment, the flexible pipe member 10 can be made of dielectric material such as plastics, in which case at least one of the connection cords for the microphone received in the microphone hold portion 12 is used as the antenna. It is also possible to provide the microphone at the base of the flexible pipe member 10 and use the flexible pipe member 10 as a voice tube.

Figure 13:
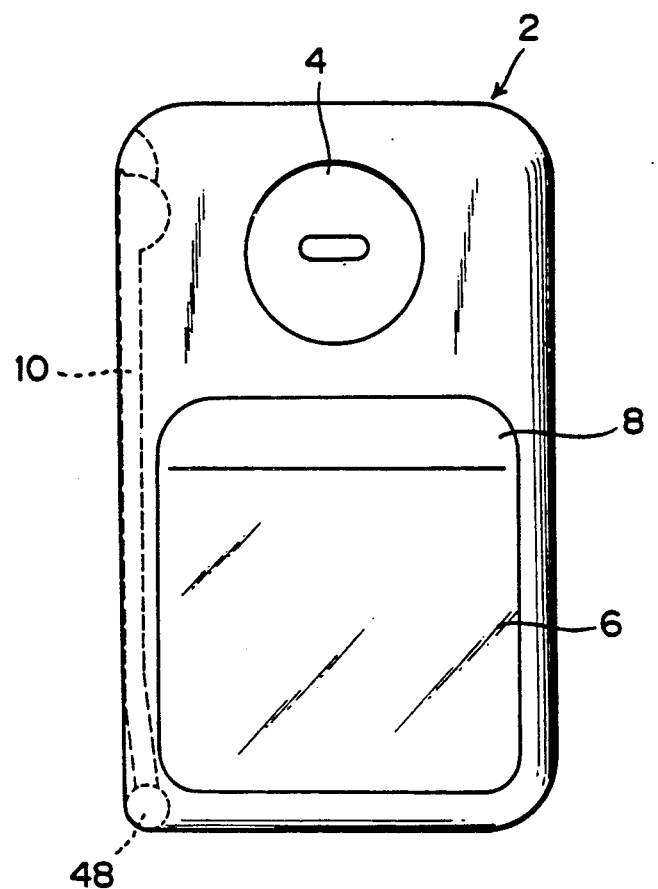
FIG. 13 is a plan view showing a fourth embodiment of a swing type.
Figure 14:
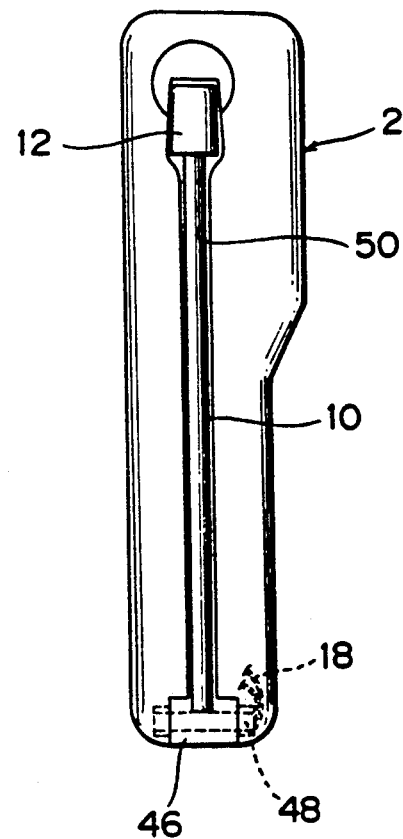
FIG. 14 is a side view of the fourth embodiment shown in FIG. 13.

Referring now to FIG. 13 and FIG. 14, a fourth embodiment of a swing type will be described. A metallic or plastic flexible pipe member 10 has a boss portion 46 rotatably attached to a shaft 48 provided on one side face of the portable telephone main body 2. A hold groove 50 is provided in the side face of the main body 2, which is adapted such that the flexible pipe member 10 is received in this hold groove 50 when the telephone is not used. When it is used, the flexible pipe member 10 is rotated round the shaft 48 so that the flexible pipe member 10 is projected from the main body 2, whereby a sufficient distance between the receiver portion 4 and the microphone hold portion 12 is secured.

Figure 15:
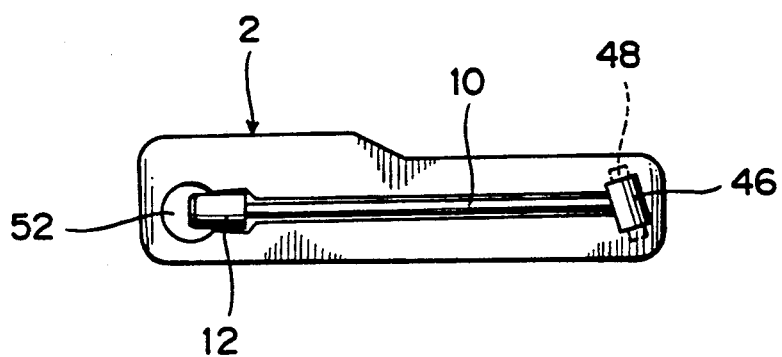
FIG. 15 is a side view showing a fifth embodiment of a swing type.
Figure 16:
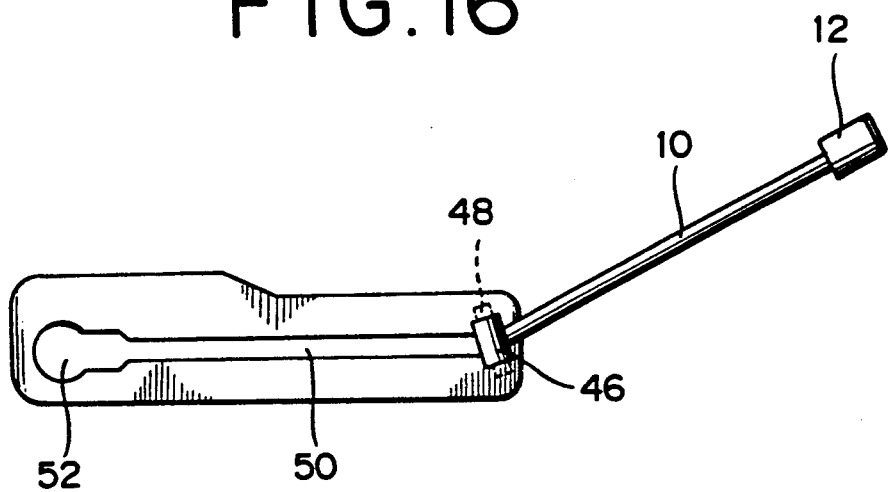
FIG. 16 is a side view of the fifth embodiment in a state where its microphone is outwardly swung.
Figure 17:
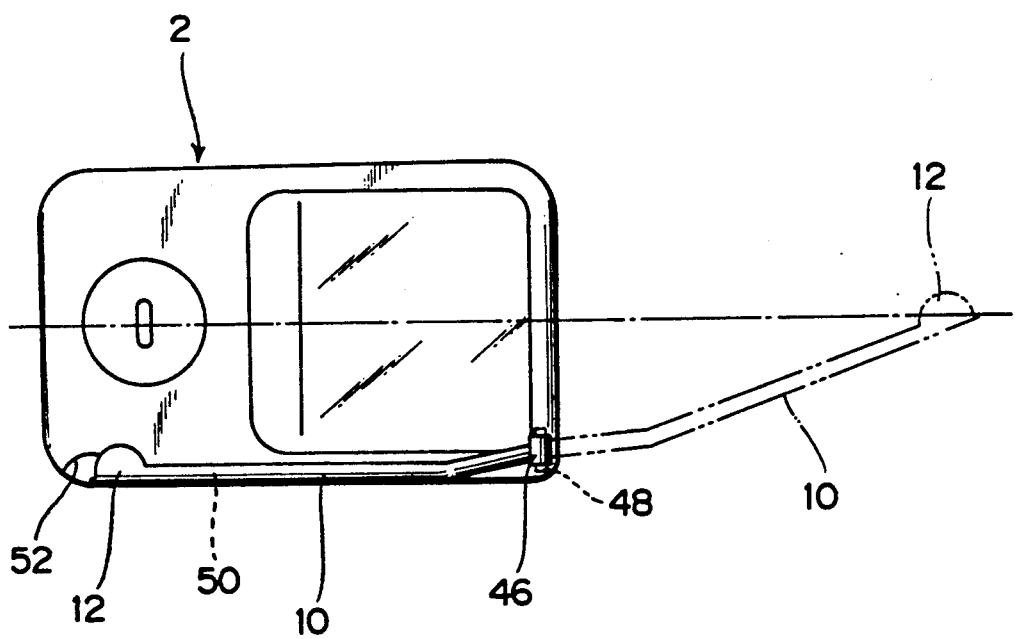
FIG. 17 is a plan view of a sixth embodiment of a swing type.

FIG. 15 and FIG. 16 show a modification of the embodiment of the swing type. In this modification, the shaft 48 is arranged aslant with respect to the top face of the main body 2 such that the boss portion 46 fitted on the shaft 48 forms an acute angle with the flexible pipe member 10. By such arrangement, when the flexible pipe member 10 is rotated round the shaft 48, the microphone hold portion 12 can be positioned, as shown in FIG. 16, in an attitude preferred from the point of view of human engineering with respect to the receiver portion 4 on the main body 2. Referring to FIG. 16, reference numeral 52 denotes an engagement groove for engaging with the microphone hold portion 12. The flexible pipe member 10 can also be fitted to the top surface of the main body 2 as shown in FIG. 17.

Also in the embodiments of the swing type as shown in FIG. 13 to FIG. 17, the flexible pipe member 10, when it is formed of metallic material, can be used as an antenna and, when the flexible pipe member 10 is formed of dielectric material, at least one of the connection cords for the microphone may be used as the antenna. Further, it is possible to provide the microphone at the base of the flexible pipe member 10, in which case the flexible pipe member 10 may be used as a voice tube.

Since the present invention is arranged as described above, such effects are obtained that the portable telephone can be sufficiently reduced in size and the receiver portion and the voice inlet portion, when the telephone is used, can be set at a distance preferred from the point of view of human engineering.

What is claimed is:

1. A portable telephone including a power source, a transmission/reception circuit, a speaker, and an antenna matching circuit, said portable telephone comprising:
   a main body;
   a pipe member formed of metallic material slidably attached to said main body;
   a slide groove formed in said body for slidably receiving said pipe member whereby said pipe member may be retracted into said groove during non-use of the telephone and extended outwardly from said groove during use of the telephone;
   a microphone attached to an end portion of said pipe member;
   first connection means for connecting said microphone, when said pipe member is pulled out of said main body, with said transmission/reception circuit;
   second connection means for connecting said pipe member with said antenna matching circuit; and said second connection means including a terminal block on a base end of said pipe member which contacts an elongated antenna element on one wall of said groove.

2. A portable telephone according to claim 1, which further includes an engagement means in said groove for holding said pipe member in said groove when said pipe member is in a retraction position.

3. A portable telephone including a power source, a transmission/reception circuit, a speaker, and an antenna matching circuit, said portable telephone comprising:
   a main body;
   a pipe member formed of dielectric material slidably attached to said main body;
   a slide groove formed in said body for slidably receiving said pipe member whereby said pipe member may be retracted into said groove during non-use of the telephone and extended outwardly from said groove during use of the telephone;
   a microphone attached to an end portion of said pipe member;
   a pair of cords connected with said microphone;
   first connection means for connecting said microphone, when said pipe member is pulled out of said main body, with said transmission/reception circuit;
   second connection means for connecting at least one of said cords with said antenna matching circuit; and said second connection means including a terminal block on a base end of said pipe member which contacts an elongated antenna element on one wall of said groove.

4. A portable telephone according to claim 2, which further includes an engagement means in said groove for holding said pipe member in said groove when said pipe member is in a retraction position.

5. A portable telephone including a power source, a transmission/reception circuit, a speaker, and an antenna matching circuit, said portable telephone comprising:
   a main body;
   a flexible pipe member formed of metallic material and having a base portion fixedly attached to said main body and a distal end portion;
   a microphone attached to said pipe member;
   connection means for connecting said pipe member with said antenna matching circuit; and
   engagement means for locking the distal end portion of said flexible pipe member to said main body when the telephone is not used, said engagement means including a receiving groove formed on an outer surface of said body whereby said pipe member may be bent to be received in said groove.

6. A portable telephone according to claim 5, wherein said microphone is attached to the distal end portion of said pipe member.

7. A portable telephone according to claim 5, wherein said microphone is attached to the base portion of said pipe member.

8. A portable telephone including a power source, a transmission/reception circuit, a speaker, and an antenna matching circuit, said portable telephone comprising:

a main body;

a flexible pipe member formed of dielectric material and having a base portion fixedly attached to said main body and a distal end portion;

a microphone attached to said pipe member;

a pair of cords connected with said microphone;

connection means for connecting at least one of said cords with said antenna matching circuit; and engagement means for locking the distal end portion of said flexible pipe member to said main body when the telephone is not used, said engagement means including a receiving groove formed on an outer surface of said body whereby said pipe member may be bent to be received in said groove.

9. A portable telephone according to claim 8, wherein said microphone is attached to the distal end portion of said pipe member.

10. A portable telephone according to claim 8, wherein said microphone is attached to the base portion of said pipe member.

11. A portable telephone including a power source, a transmission/reception circuit, a speaker, and an antenna matching circuit, said portable telephone comprising:

a main body;

a pipe member formed of metallic material swingably attached to said main body;

a boss member connected to said pipe member such that an acute angle is formed therebetween, said boss member and said pipe member being mounted for rotation to said main body aslant with respect to a top surface thereof;

a microphone attached to an end portion of said pipe member;

connection means for connecting said pipe member with said antenna matching circuit; and engagement means for locking said pipe member to said main body when the telephone is not used.

12. A portable telephone according to claim 9, wherein said engagement means includes a receiving groove formed on an outer surface of said body for receiving said pipe member.

13. A portable telephone including a power source, a transmission/reception circuit, a speaker, and an antenna matching circuit, said portable telephone comprising:

a main body;

a pipe member formed of dielectric material swingably attached to said main body;

a boss member connected to said pipe member such that an acute angle is formed therebetween, said boss member and said pipe member being mounted for rotation to said main body aslant with respect to a top surface thereof;

a microphone attached to an end portion of said pipe member;

a pair of cords connected with said microphone;

connection means for connecting at least one of said cords with said antenna matching circuit; and engagement means for locking said pipe member to said main body when the telephone is not used.

14. A portable telephone according to claim 11, wherein said engagement means includes a receiving groove formed on an outer surface of said body for receiving said pipe member.

* * * * *